(12) United States Patent
Gee et al.

(10) Patent No.: US 12,297,819 B2
(45) Date of Patent: May 13, 2025

(54) PULSATION DAMPER

(71) Applicant: Aspen Pumps Ltd, Hailsham (GB)

(72) Inventors: Christopher John Gee, Berkshire (GB); Chris Alexis Forshaw, East Sussex (GB); Gary Paul Haffenden, East Sussex (GB)

(73) Assignee: Aspen Pumps Ltd, Hailsham East Sussex (GB)

( * ) Notice: Subject to any disclaimer, the term of this patent is extended or adjusted under 35 U.S.C. 154(b) by 0 days.

(21) Appl. No.: 17/783,813

(22) PCT Filed: Sep. 10, 2020

(86) PCT No.: PCT/GB2020/052170
§ 371 (c)(1),
(2) Date: Jun. 9, 2022

(87) PCT Pub. No.: WO2021/116644
PCT Pub. Date: Jun. 17, 2021

(65) Prior Publication Data
US 2023/0009988 A1    Jan. 12, 2023

(30) Foreign Application Priority Data
Dec. 9, 2019   (GB) ...................................... 1917990

(51) Int. Cl.
*F04B 11/00*    (2006.01)
*F04B 39/00*    (2006.01)
(Continued)

(52) U.S. Cl.
CPC ...... *F04B 11/0025* (2013.01); *F04B 11/0091* (2013.01); *F04B 39/0027* (2013.01); *F04B 53/001* (2013.01); *F16L 55/052* (2013.01)

(58) Field of Classification Search
CPC .... F04B 11/0016–0025; F04B 11/0091; F04B 39/0027–0072; F04B 53/001; F16L 55/045–052
(Continued)

(56) References Cited

U.S. PATENT DOCUMENTS 2,489,491 A * 11/1949 Johnson ................ F16L 55/053
                                                    138/30
2,630,833 A *  3/1953 Ragsdale .............. F16L 55/052
                                                    138/26
(Continued)

FOREIGN PATENT DOCUMENTS

DE         520426 C        3/1931
DE         806400 C        6/1951
(Continued)

OTHER PUBLICATIONS

International Search Report for corresponding Application No. PCT/GB2020/052170 dated Oct. 21, 2020, 5 pages.
(Continued)

*Primary Examiner* — Alexander B Comley
(74) *Attorney, Agent, or Firm* — Taft Stettinius & Hollister LLP

(57) ABSTRACT

A pulsation damper for a condensate pump including a body having a fluid inlet, a fluid outlet, an inner wall portion and an outer wall portion, wherein the inner and outer wall portions define an inner fluid region and an outer fluid region, wherein the inner fluid region is in fluid communication with the outer fluid region, wherein a fluid flow path is formed from the fluid inlet to the fluid outlet via the inner fluid region, wherein the outer fluid region is in fluid communication with an air inlet and configured to maintain an air pocket, and wherein the air pocket is configured to
(Continued)

dissipate pulsations within liquid entering the fluid inlet prior to being discharged from the fluid outlet.

19 Claims, 4 Drawing Sheets

(51) Int. Cl.
*F04B 53/00* (2006.01)
*F16L 55/052* (2006.01)

(58) Field of Classification Search
USPC .............................................. 138/26, 30–31
See application file for complete search history.

(56) References Cited

U.S. PATENT DOCUMENTS

| | | | | | |
|---|---|---|---|---|---|
| 2,896,862 | A | * | 7/1959 | Bede | F04B 11/0025 137/565.34 |
| 3,038,553 | A | * | 6/1962 | Peters | F16L 27/1021 138/120 |
| 3,137,316 | A | * | 6/1964 | Everett | F16L 55/052 137/842 |
| 3,146,796 | A | * | 9/1964 | Everett | F16L 55/045 138/26 |
| 3,169,551 | A | * | 2/1965 | Lewis | F16L 55/053 138/26 |
| 3,331,399 | A | * | 7/1967 | Von Forell | F16L 55/052 138/30 |
| 3,473,565 | A | * | 10/1969 | Blendermann | F16L 55/054 137/593 |
| 3,532,124 | A | * | 10/1970 | Lowery | F16L 55/045 138/26 |
| 3,616,627 | A | * | 11/1971 | Everett et al. | F01N 1/089 96/380 |
| 3,669,150 | A | * | 6/1972 | Everett | F16L 41/02 417/543 |
| 3,731,709 | A | * | 5/1973 | Glover | F16L 55/04 181/240 |
| 4,163,461 | A | * | 8/1979 | Jacobellis | F16L 55/053 138/30 |
| 4,298,029 | A | * | 11/1981 | Zahid | F16L 55/053 138/30 |
| 4,445,829 | A | * | 5/1984 | Miller | F16L 55/053 417/543 |
| 4,514,151 | A | * | 4/1985 | Anders | F04B 11/0091 138/30 |
| 6,957,669 | B2 | * | 10/2005 | Suzuki | F15B 1/103 220/721 |
| 7,527,074 | B1 | * | 5/2009 | Gray, Jr. | F15B 1/165 138/30 |
| 8,939,177 | B2 | * | 1/2015 | Condon | F16L 55/053 138/30 |
| 2003/0072660 | A1 | * | 4/2003 | Lawson | F04B 39/0027 137/856 |
| 2005/0089428 | A1 | * | 4/2005 | Navarro | F16L 55/052 417/540 |
| 2010/0154910 | A1 | * | 6/2010 | Larsen | F16L 55/052 138/30 |
| 2015/0096640 | A1 | * | 4/2015 | Condon | F16L 55/053 138/31 |
| 2018/0142450 | A1 | * | 5/2018 | Oh | E03B 7/077 |

FOREIGN PATENT DOCUMENTS

| | | | |
|---|---|---|---|
| DE | 1277020 B | | 9/1968 |
| EP | 3067528 A1 | | 9/2016 |
| GB | 2568285 A | * | 5/2019 ............. F04B 11/00 |

OTHER PUBLICATIONS

Written Opinion for corresponding Application No. PCT/GB2020/052170 dated Oct. 21, 2020, 7 pages.
Combined Search and Examination Report for corresponding Application No. GB1917990.2 dated Jun. 10, 2020, 6 pages.

* cited by examiner

PULSATION DAMPER

CROSS REFERENCE TO RELATED APPLICATIONS

This is a U.S. National Stage Application of, and claims priority to, PCT/GB2020/052170, filed Sep. 10, 2020, which further claims priority to UK patent application s/n GB1917990.2, filed Dec. 9, 2019, the contents of each is incorporated herein by reference in its entirety.

This invention relates to a pulsation damper, in particular but not exclusively, for dampening pulsations in fluids flowing from a reciprocating pump.

BACKGROUND

Air conditioning units generate condensation as part of the evaporation-condensation cycle used to condition air. The condensation is often collected in a reservoir before being pumped away, typically by a reciprocating pump. However, the pumping cycle of reciprocating pumps generates pressure waves at the pump outlet which are transferred to the liquid being discharged. These pressure waves travel through the liquid and cause high frequency vibrations in the discharge line. Aside from mechanical wear and damage to components that are in close proximity, these vibrations can generate significant amounts of noise as ducting or casings used to route air conditioning components also act to amplify the noise generated by the discharge line rattling against surfaces. This is particularly undesirable when the system is intended for indoor use.

One solution to this problem is to apply a pulsation damper. Pulsation dampers typically use a compressible bladder or diaphragm to dissipate the pressure waves generated by the pump outlet. Alternative arrangements known in the art include dispersion systems that use a series of walls to disperse the pressure wave to create a smooth liquid flow. However, such prior art systems are complicated to manufacture and require additional equipment, such as compressed air cylinders in the case of bladder pulsation dampeners, to operate.

Typically, a pulsation damper is located as close as possible to the source of vibrations in a system. In the case of air conditioning or refrigeration systems, this will be the condensate pump. As such, the pulsation damper is located as close as possible to the condensate pump, which is not practical if additional equipment has to be installed next to an indoor air conditioning system. By dissipating pulsations in the liquid downstream of the pulsation damper, vibrations in the discharge pipe due to the pulsations are largely eliminated.

Such equipment can also take up considerable space which is particularly undesirable if a pulsation damper is to be used with an indoor system, such as an air conditioner or refrigerator, where space may be at a premium. Indoor systems that require condensate pumps to pump liquid to enable the respective systems to operate need to operate discretely and with minimal additional equipment due to space constraints. Where space is constrained or where tubing needs to be routed along a specific route, there may only be certain configurations in which the vibration damper can be installed. As pulsation dampers typically have an orientation in which they must be installed to operate properly, space constraints for a given installation may render these devices ineffective. These space constraints may not be known to an installer until they are on site, which may result in delays or needing to carry multiple different pulsation dampers so that a suitable one can be fitted for a given installation.

The present disclosure seeks to address these problems.

BRIEF SUMMARY OF THE DISCLOSURE

Viewed from a first aspect, the present invention provides a pulsation damper for a condensate pump comprising a body having a fluid inlet, a fluid outlet, an inner wall portion and an outer wall portion. The inner and outer wall portions define an inner fluid region and an outer fluid region. The inner fluid region is in fluid communication with the outer fluid region. A fluid flow path is formed from the fluid inlet to the fluid outlet via the inner fluid region. The outer fluid region is in fluid communication with an air inlet and configured to maintain an air pocket, and the air pocket is configured to dissipate pulsations within liquid entering the fluid inlet prior to liquid being discharged from the fluid outlet.

Thus, the present invention provides a device which dissipates pulsatile energy within condensate being discharged from a condensate pump. This is desirable, as it reduces the noise due to rattling of the discharge line against external housings, casings or nearby equipment. This enables a more flexible condensate pumping system, as it is no longer essential to route the discharge line away from any adjacent equipment that the discharge line may have rattled against.

The body may have a length and the outer fluid region may extend along the length of the body.

The inner wall portion may be spaced from the outer wall portion by a distance of 1.0 mm to 4.0 mm. A larger spacing is advantageous, as it provides a larger air pocket and allows for greater compressibility of the air-liquid mix within the pulsation damper.

The pulsation damper may further comprise a flow redirecting element configured to redirect the fluid flow between the fluid inlet and the fluid outlet. Redirecting the flow of liquid within the pulsation damper further helps to dissipate pulsations within the condensate. The flow redirecting element may be secured within the body between the fluid inlet and the fluid outlet.

The flow redirecting element may comprise an extending member configured to direct air from the air inlet towards the outer fluid region. This advantageously maintains the air pocket in the outer fluid region. The extending member may be configured to receive fluid from the fluid inlet from a first direction and redirect the fluid away from the extending member in a second direction different than the first direction. The fluid flow may at least partially reverse direction between the first direction and second direction.

The flow redirecting element may comprise a first surface having a protrusion facing the inlet flow. This advantageously breaks up the flow and reduces the pulsations in the fluid entering the pulsation damper. The first surface may be configured to dissipate pulsations within the liquid entering from the fluid inlet and the fluid inlet may be configured to direct fluid towards the protrusion.

The inner fluid region may be sub-divided into first and second inner fluid volumes by the flow redirecting element. The first and second inner fluid volumes may be in fluid communication, and the air inlet may be configured to introduce air into the first inner fluid volume.

The fluid inlet may extend into the first inner fluid volume. The fluid outlet may extend into the second inner fluid volume. The air inlet may comprise a plurality of air inlet channels each having a one-way valve. Each air inlet channel may comprise a damper element configured to dampen noise emitted by the one-way valve. The damper element may be arranged upstream of the one-way valve. By preventing the flow of air out of the air inlet, the damper prevents any noise generated by the one-way valve introducing air into the inner volume from being emitted. This is particularly beneficial in an indoor application, where such noise would be particularly undesirable.

Where a flow redirecting element is present, the one-way valve may be comprised within the flow redirecting element. The one-way valve may be located downstream of the damper element.

The outer fluid region may be sub-divided into a plurality of outer fluid volumes by a plurality of wall connecting members extending between the inner and outer wall portions. Each of the outer fluid volumes may be configured to maintain a portion of the air pocket. This is particularly advantageous, as it allows the pulsation damper to be effective when installed in any orientation, providing a versatile device to dampen pulsations in fluid discharged from a motor outlet.

The inner wall portion may comprise a plurality of ports to connect each of the outer fluid volumes with the inner fluid volume. The plurality of ports may be located adjacent to the fluid inlet. The plurality of outer fluid volumes may be spaced around the perimeter of the body.

The fluid inlet may comprise an internal profile having a first taper. The first taper may narrow in the direction of fluid flow. The internal profile may a second taper downstream of the first taper, and the second taper may widen in the direction of fluid flow.

The fluid outlet comprises an internal profile having a first taper. The first taper of the fluid outlet may narrow in the direction of fluid flow. The internal profile of the fluid outlet may comprise a second taper downstream of the first taper, and the second taper may widen in the direction of fluid flow.

BRIEF DESCRIPTION OF THE DRAWINGS

Embodiments of the invention are further described hereinafter with reference to the accompanying drawings, in which.

DETAILED DESCRIPTION

Figure 1:
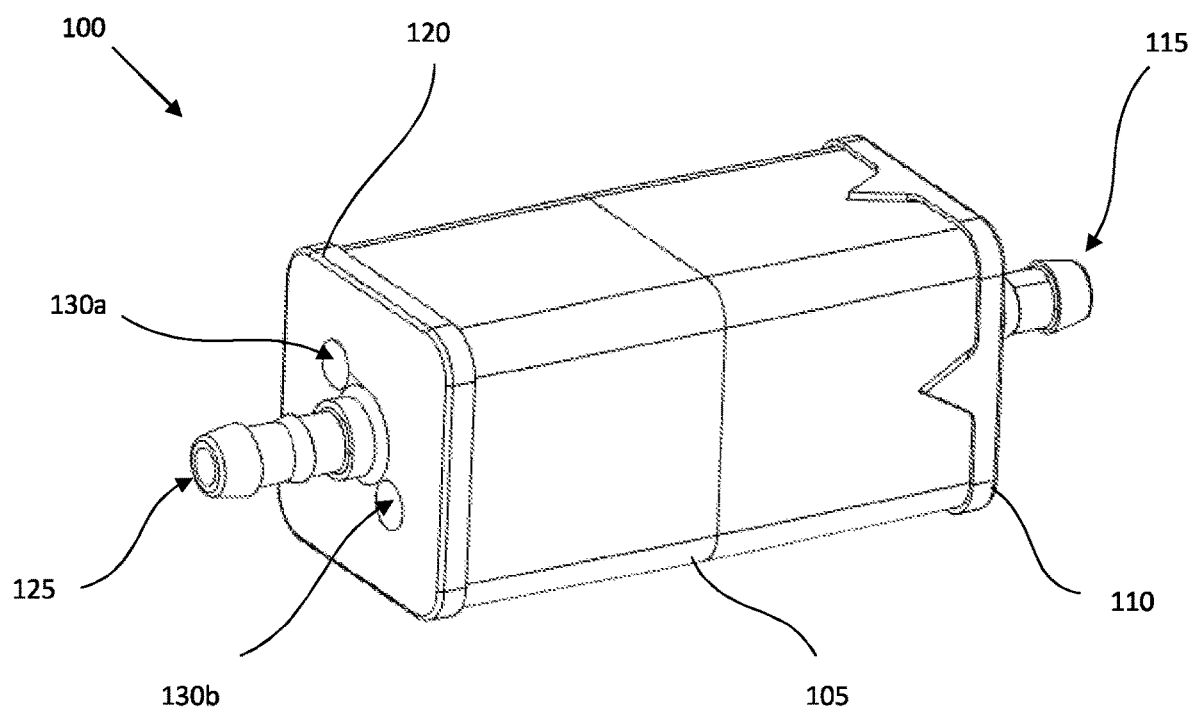
FIG. 1 illustrates a perspective view of a pulsation damper.

FIG. 1 illustrates a perspective view of a pulsation damper 100. The pulsation damper is formed of a body 105 with an inlet cap 110 and an outlet cap 120 secured at opposed ends of the body 105. The inlet cap 110 and outlet cap 120 are substantially planar and perpendicular to a longitudinal axis of the body 105. A fluid inlet 115 extends from the outer surface of the inlet cap 110. The fluid inlet 115 has an external portion 115a configured to connect to a pump outlet (not shown) from a condensate pump. The external portion 115a of the fluid inlet 115 has a barbed end to enhance the fit between the fluid inlet 115 and a tube (not shown) connecting the pulsation damper to the pump outlet. The pump may be driven by a reciprocating motor. A fluid outlet 125 extends from the outer surface of the outlet cap 120. The fluid outlet 125 has an external portion 125a configured to connect to a discharge line (not shown) to discharge condensate away from the condensate pump once pulsations within the liquid have been dissipated. The external portion 125a of the fluid outlet 125 has a barbed end to enhance the fit with the discharge line. The outlet cap 120 is also shown having two air inlets 130a, 130b to introduce air to the inner volume of the body 105, for a purpose to be described below.

Figure 2:
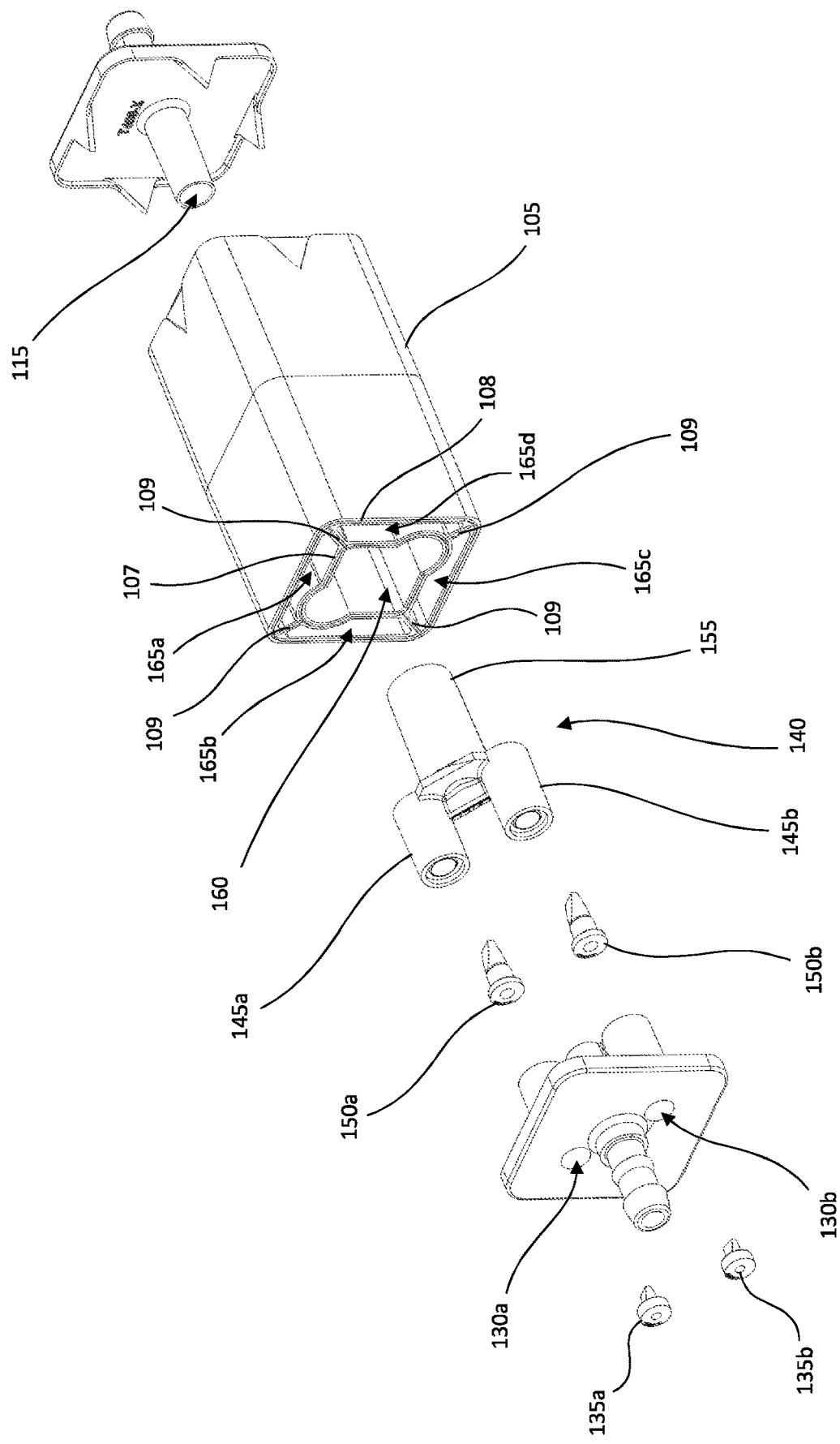
FIG. 2 illustrates an exploded view of the pulsation damper.

FIG. 2 illustrates an exploded view of the pulsation damper 100. The fluid inlet 115 has an internal portion 115b extending from the inner surface of the inlet cap 110 into an inner volume 160 of the body 105. A flow redirecting member 140 is also illustrated in FIG. 2. The flow redirecting element has a first member 155 extending in a first direction towards the fluid inlet 115 to receive at least the downstream end of the internal portion 115b of the fluid inlet 115, and second 145a and third 145b members each extending in a second direction. The second direction is substantially opposed to the first direction. The second 145a and third 145b members receive respective one-way valves 150a, 150b which permit the introduction of air into the inner volume 160 of the body 105. The body 105 is formed of an inner wall 107 and an outer wall 108 which define the inner volume 160 and an outer volume 165 within the body. Four connecting members 109 space the inner 107 and outer 108 walls apart and divide the outer volume 165 into four regions 165a, 165b, 165c and 165d. As shown in FIG. 2, the four regions 165a, 165b, 165c and 165d are spaced around the perimeter of the body 105. As illustrated in FIG. 2, the spacing between the inner 107 and outer 108 walls is consistent along the length of the body 105. The inner wall 107 and the outer wall 108 are spaced by a distance of 1.0 mm to 4.0 mm. At the narrowest point, the inner wall 107 is spaced from the outer wall 108 by 1.2 mm. At the widest point, the inner wall 107 is spaced from the outer wall 108 by 3.5 mm. It would be understood that the spacings provided here are merely exemplary and that the spacings between the inner 107 and outer 108 walls will depend on the particular application. The connecting members 109, inner wall 107 and outer wall 108 extend substantially the length of the body 105.

As shown in FIG. 2, an internal portion 125b of the fluid outlet 125 extends from the inner surface of the outlet cap 120 into the inner volume 160 of the body 105. The outlet cap 120 is also shown having dampers 135a, 135b which are secured within respective air inlets 130a, 130b. The air inlets 130a, 130b extend from the inner surface of the outlet cap 120 into the inner volume 160 of the body 105. The internal portion 125b of the fluid outlet 125 and the air inlets 130a, 130b are shown extending by the same amount into the inner volume 160 of the body 105; however, it would be apparent this is not essential. When the outlet cap 120 is secured to the body 105, the air inlets 130a, 130b abut against the respective second 145a and third 145b members of the flow redirecting element 140, securing the one-way valves 150a, 150b within the flow redirecting element 140 and securing the flow redirecting element 140 to the body 105. The flow redirecting element 140 abuts a collar 172 of the body 105 (see FIG. 3A) extending from the inner wall 107 into the inner volume 160. The air inlets 130a, 130b acts as an anti-syphoning device. This arises from the pressure difference between the discharge line continuing to remove liquid from the condensate pump when the condensate pump is switched off. Without an anti-syphoning device, the condensate pump would ordinarily run dry as liquid would be drawn through the condensate pump. This would lead to the condensate pump starting up from a 'dry' state, which in turn would result in the condensate pump operating in a noisy manner. The dampers 135a, 135b reduce the noise of the one-way valves 150a, 150b when air is introduced into the inner volume 160 of the body 105. Introducing air into a liquid-filled inner volume 160 generates noise at each of the one-way valves 150a, 150b. To mitigate this, the dampers 135a, 135b are located upstream of the one-way valves 150a, 150b and substantially eliminate the noise emitted by the one-way valves 150a, 150b. The dampers 135a, 135b are preferably duck-billed valves. The one-way valves 150a, 150b are preferably duck-billed valves. Any of the dampers 135a, 135b and one-way valves 150a, 150b may be made from rubber. The flow redirecting element 140 also divides the inner volume 160 of the body 105 into respective first 185 and second 190 inner regions (see FIG. 3A).

Figure 3A:
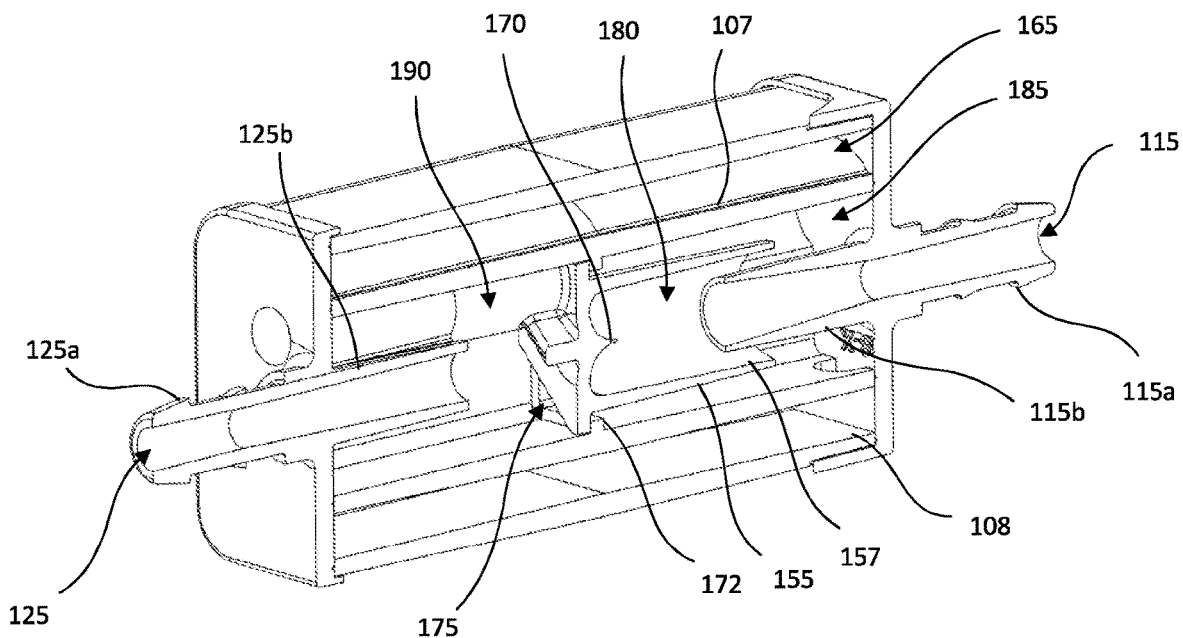
FIGS. 3A and 3B illustrate respective perspective and side cross-sectional views through a longitudinal axis of the pulsation damper.
Figure 3B:
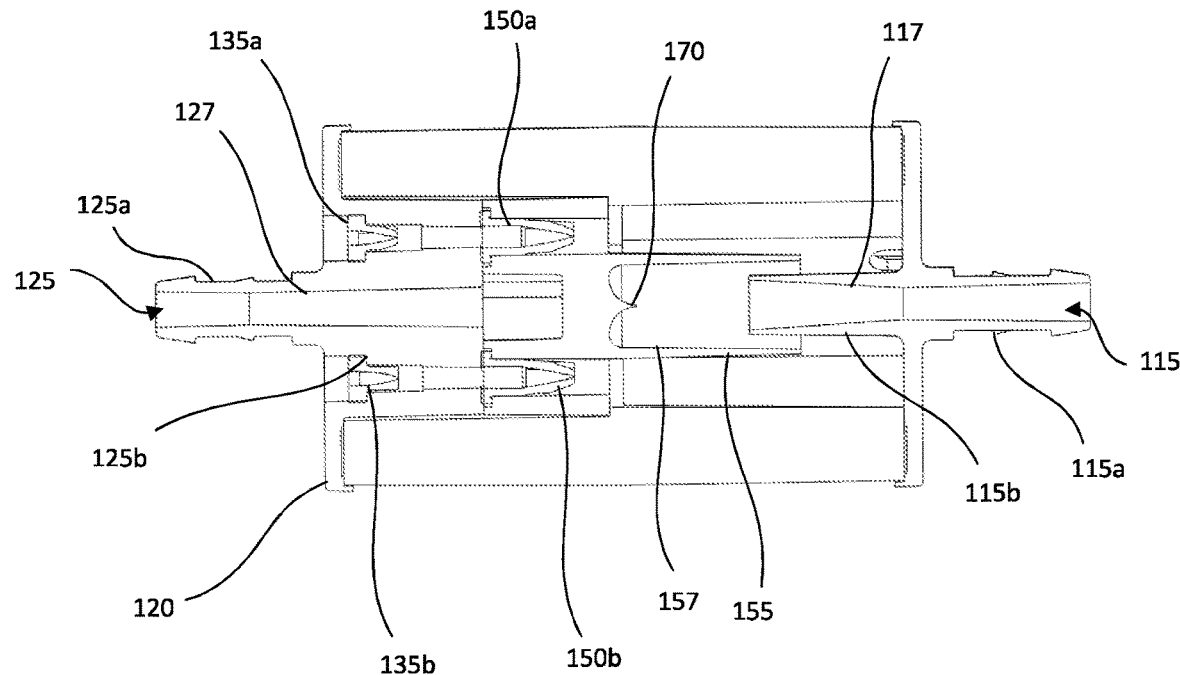
Figure 5:
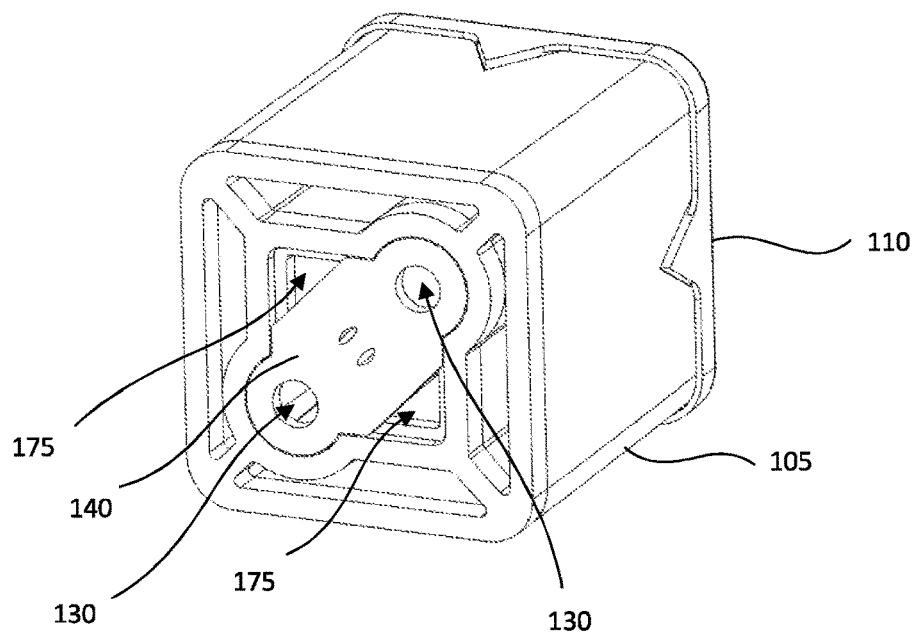
FIG. 5 illustrates a further perspective cross-sectional view of the centre of the pulsation damper.

The fluid flow path from the liquid inlet to the liquid outlet is best illustrated by FIGS. 3A and 3B. Condensate enters the pulsation damper 100 through the fluid inlet 115 via the flow redirecting element 140 in a first direction. Specifically, condensate enters the flow redirecting volume 180 of the extension 155 in the first direction, towards the outlet 125, through the internal portion 115b of the fluid inlet 115. The extension 155 is preferably a substantially cylindrical surface with an open end to receive the internal portion 115b of the fluid inlet 115 and an opposed closed end having a protrusion 170 facing the inlet flow from the fluid inlet 115. As condensate enters the pulsation damper 100, it is redirected within extension 155 from the first direction to a second direction, which is opposed or reversed from the first direction, by virtue of the extension 155 of the flow redirecting element 140. The closed end forces the redirection of fluid flow from the first direction to the second direction and the incoming fluid flow through the fluid inlet 115 prevents the flow of liquid back through the fluid inlet 115. Condensate is then forced to flow through the annular path formed between the internal portion 115b of the fluid inlet 115 and the open end of extension 155 in the second direction into the first inner region 185, before being redirected a second time to flow around the outer surface of the extension 155 in the first direction once more. Two ports 175 defined by respective gaps between the collar 172 and the flow redirecting element 140 connect the first 185 and second 190 inner regions and allow condensate to pass from the first inner region 185 to the second inner region 190 (see also FIG. 5). Condensate can then be discharged from the second inner region 190 through the fluid outlet 125. While two ports 175 are described, it would be apparent that one port 175 or more than two ports 175 may be equally suitable.

While the port 175 is described as being formed between the flow redirecting element 140 and the collar 172, it would be apparent that this is merely an example and that other configurations are possible. For example, the port 175 may be formed by any or all of the inner wall 107, the collar 172 and the flow redirecting element 140. While the protrusion 170 aids the redirection of condensate within the extension 155 and dissipates pulsations within the condensate entering the pulsation damper 100, it is not essential to the pulsation damper 100.

The internal portion 115b of the fluid inlet 115 may have a tapered internal surface 117 to help dissipate some of the pulsatile energy within condensate entering the pulsation damper 100. The taper may widen in the direction of fluid flow. The taper may extend for less than the whole length of the internal surface 117. The taper may begin at the inner surface of the inlet cap 110 and finish at the end of the fluid inlet 115.

The fluid outlet 125 may have a tapered internal surface 127 to help dissipate pulsatile energy within condensate leaving the pulsation damper 100. The taper may narrow in the direction of fluid flow. The taper may widen in the direction of fluid flow. The internal surface 127 may have more than one tapered section. The internal surface 127 may have a narrowing taper upstream of a widening taper. The taper may extend for less than the whole length of the internal surface 127. The taper may extend the length of the fluid outlet 125. Where the internal surface 127 has multiple tapers, the first taper may end beyond the outlet cap 120. The second taper may begin beyond the outlet cap 120.

The extension 155 may have a tapered internal surface 157. The extension 155 may have a first internal diameter at the open end and a second diameter at the closed end. The first diameter may be larger than the second diameter. The taper may extend for less than the whole length of the internal surface 157.

Figure 4:
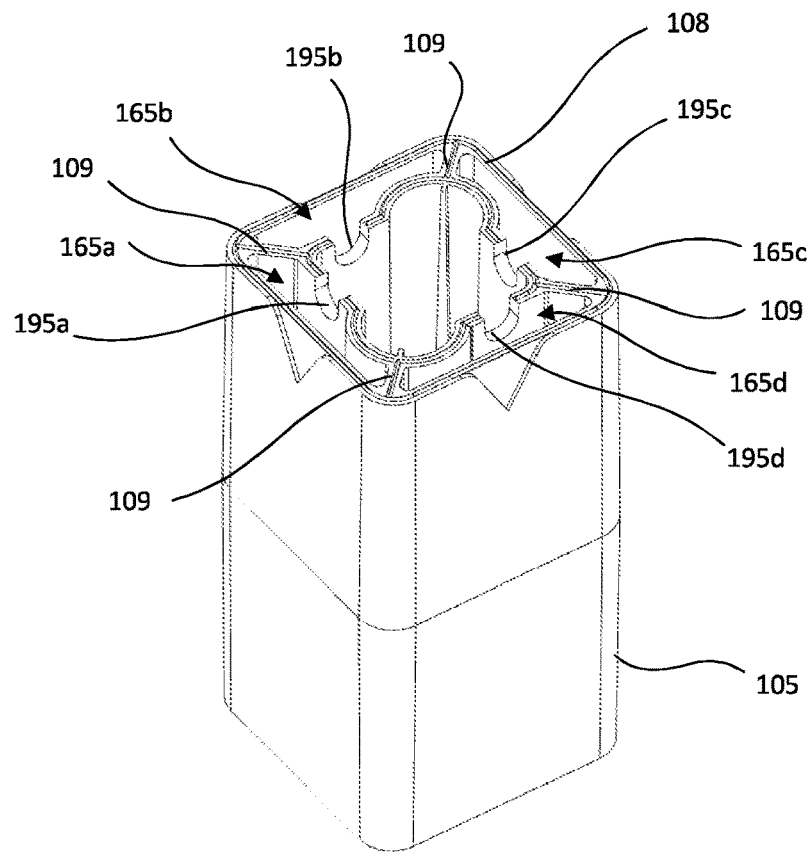
FIG. 4 illustrates a perspective cross-sectional view of an end of the pulsation damper.

Air enters the pulsation damper 100 via the air inlets 130a, 130b, passing through the respective dampers 135a, 135b and one-way valves 150a, 150b before entering the first inner region 185. While the inclusion of a damper 135a, 135b is preferable, it is not essential. Air flows from the first inner region 185 into respective outer regions 165a, 165b, 165c, 165d through respective ports 195a, 195b, 195c, 195d formed within the inner wall 107 (see FIG. 4). While the air ports 195 may allow for air to pass from the first inner region 185 to the outer regions 165, the primary purpose of the air inlets 150, ports 195 and inner wall 107 are to substantially eliminate the need to replenish the air pockets in the outer regions 165 once the pulsation damper is installed and the condensate pump is primed. By having air pockets distributed around the perimeter, the pulsation damper 100 can remain effective regardless of the orientation it is installed. The outer regions 165 are designed to maximise the size of the air pockets in the pulsation damper 100. The outer regions 165 preferably extend substantially the length of the body 105. By maintaining a portion of the air pocket within at least one of the outer regions 165, the liquid within the pulsation damper 100 becomes effectively compressible. The air pocket allows pulsations within the condensate to be dissipated within the pulsation damper 100, rather than being transmitted down the discharge line. While four ports 195a, 195b, 195c, 195d connecting the first inner region 185 to respective outer regions 165a, 165b, 165c, 165d are shown, it would be understood that fewer or more than four ports and/or outer regions may be utilised. Further, the number of ports 195 need not equal the number of outer regions 165. For example, the first inner region 185 may be connected to a particular outer region 165 by two or more ports 175. While the ports 195 are preferably formed as slots adjacent to the inlet cap 110, it would be apparent this need not be the case, and that the ports 195 may be formed as a slot or any other suitable shape. It is preferable to locate the port 195 is adjacent to the inlet cap 110, as this maximises the height of the air pocket within the pulsation damper 100. While it is preferable to locate the port 195 adjacent to the inlet cap 110, it would be apparent that the port 195 may be in line with any part of the internal portion 115b of the fluid inlet 115. The ports 195 may also be comprised entirely within the inner wall 107.

The ports 195a, 195b, 195c, 195d are preferably formed as a slot originating at the inlet cap 110 and extending by a first distance towards the outlet cap 120. The first distance may be 3.5 mm. In one example, the slot has a width of 4.0 mm, which balances the ease with which air can pass between the outer regions 165a, 165b, 165c, 165d and the risk of debris within the liquid blocking the ports 195a, 195b, 195c. However, as the performance of the damper can be influenced by the size of the outer regions 165a, 165b, 165c, 165d as well as the dimensions of ports 195a, 195b, 195c, 195d, in some cases any of the ports 195a, 195b, 195c, 195d may have a width of up to 6 mm and a height of up to 6 mm.

The functionality of the fluid flow path when a pulsation damper 100 is installed in the horizontal and vertical orientations will now be described. When installed in a vertical direction, where the fluid inlet 115 is arranged above the fluid outlet 125, condensate will enter the extension 155 and contact the protrusion 170 on the closed end of the flow redirecting element 140. Once condensate has filled the extension 155, it will flow towards the second inner region 190 by passing through the ports 175 connecting the first inner region 185 and the second inner region 190. When the second inner region 190 fills with condensate such that the level of condensate within the second inner region 190 is above the level of the fluid outlet 125, condensate will be able to flow out of the second inner region 190 through the fluid outlet 125 and be discharged from the pulsation damper 100.

When the pulsation damper 100 is installed in a horizontal orientation, condensate flows from the fluid inlet 115 into the flow redirecting volume 180 of the extension 155 before being redirected to flow in a second opposed or reversed direction. As the pulsation damper 100 is horizontal, the flow redirecting volume 180 does not need to fill before condensate can flow out of the extension and onto one of the inner walls 107. Condensate will continue along the inner wall 107 and enter the second inner region 190 through one of the ports 175, filling the second inner region 190. Once the liquid level in the second inner region 190 is sufficiently high, condensate can flow out of the fluid outlet 125 and be discharged. In this orientation, at least one outer region 165 will be located above one of the air inlets 130a, 130b. It has been found that the air inlet in contact with liquid in the first inner region 185 acts as a better anti-syphon device than the air inlet only in contact with air within the first inner region 185. When the pulsation damper 100 is not completely full of condensate, some air will be present in the outer region 165 located above the air inlets 130a, 130b, and an air pocket will present.

Thus, regardless of what orientation the pulsation damper 100 is mounted, an air pocket will be maintained within one of the outer regions 165. Consequently, the liquid within the pulsation damper 100 is effectively compressible. This aids in the dissipation of pressure waves within the liquid, as the deformation of the air pockets trapped within the outer region 165, helps absorb the pulsatile energy within the liquid. Further, the pulsation damper 100 can be used in confined or constrained spaces around a condensate pump, for example due to external ducting or equipment, as the pulsation damper 100 remains operational in any orientation. It is also desirable to design the pulsation damper 100 to have similar dimensions to the condensate pump, as this can allow for easier installation of the condensate pump and pulsation damper 100.

The terms "upstream" and "downstream" refer to relative positions of elements of the pulsation damper 100 described in relation to the direction of fluid as it flows through the pulsation damper 100 from the fluid inlet 115 to the fluid outlet 125.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A pulsation damper for a condensate pump comprising: a body having a fluid inlet, a fluid outlet, and inner and outer wall portions, wherein the inner and outer wall portions define an inner fluid region and an outer fluid region, wherein the outer fluid region is sub-divided into outer fluid volumes by wall connecting members that extend between the inner and outer wall portions, wherein the inner fluid region is in fluid communication with the outer fluid region, wherein a fluid flow path is formed from the fluid inlet to the fluid outlet via the inner fluid region, wherein the outer fluid region is in fluid communication with an air inlet and configured to maintain an air pocket, and wherein the air pocket is configured to dissipate pulsations within liquid entering the fluid inlet prior to liquid being discharged from the fluid outlet.

2. The pulsation damper of claim 1, wherein the body has a length and the outer fluid region extends along the length of the body.

3. The pulsation damper of claim 1, wherein the inner wall portion is spaced from the outer wall portion by a distance of 1.0 mm to 4.0 mm.

4. The pulsation damper of claim 1, further comprising a flow redirecting element configured to redirect a fluid flow between the fluid inlet and the fluid outlet.

5. The pulsation damper of claim 4, wherein the flow redirecting element is secured within the body between the fluid inlet and the fluid outlet.

6. The pulsation damper of claim 5, wherein the flow redirecting element includes a first surface having a protrusion configured to dissipate pulsations within a liquid entering from the fluid inlet, and wherein the fluid inlet is configured to direct fluid towards the protrusion.

7. The pulsation damper of claim 5, wherein the inner fluid region is sub-divided into first and second inner fluid volumes by the flow redirecting element, wherein the first and second inner fluid volumes are in fluid communication, and wherein the air inlet is configured to introduce air into the first inner fluid volume.

8. The pulsation damper of claim 7, wherein the fluid inlet extends into the first inner fluid volume.

9. The pulsation damper of claim 7, wherein the fluid outlet extends into the second inner fluid volume.

10. The pulsation damper of claim 4, wherein the flow redirecting element includes an extending member configured to direct air from the air inlet towards the outer fluid region.

11. The pulsation damper of according to claim 10, wherein the extending member is configured to receive fluid from the fluid inlet from a first direction and redirect the fluid away from the extending member in a second direction different than the first direction.

12. The pulsation damper of claim 11, wherein the fluid flow at least partially reverses direction between the first direction and second direction.

13. The pulsation damper of claim 1, wherein the air inlet includes air inlet channels each having a one-way valve.

14. The pulsation damper of claim 13, wherein each air inlet channel includes a damper element configured to dampen noise emitted by the corresponding one-way valve.

15. The pulsation damper of claim 14, wherein the damper element is arranged upstream of the one-way valve.

16. The pulsation damper of claim 13, further comprising a flow redirecting element configured to redirect a fluid flow between the fluid inlet and the fluid outlet, wherein the one-way valves are included within the flow redirecting element.

17. The pulsation damper of claim 1, wherein each of the outer fluid volumes is configured to maintain a portion of the air pocket.

18. The pulsation damper of claim 17, wherein the inner wall portion includes ports to connect each of the outer fluid volumes with the inner fluid volume.

19. The pulsation damper of claim 18, wherein the ports are located adjacent to the fluid inlet.

* * * * *